May 9, 1967    D. L. SWANSON    3,318,500

PROCESS FOR CUTTING RIGID TUBING

Filed June 11, 1964

INVENTOR.
DOUGLAS L. SWANSON
BY

United States Patent Office 3,318,500
Patented May 9, 1967

3,318,500
PROCESS FOR CUTTING RIGID TUBING
Douglas L. Swanson, Erie, Pa., assignor to Swanson-Erie Corporation, Erie, Pa., a corporation of Pennsylvania
Filed June 11, 1964, Ser. No. 374,319
2 Claims. (Cl. 225—2)

This invention relates to glass cutting machines and, more particularly, a glass cutting machine or process for use in cutting off glass tubing at high production rates.

Previous glass cutting processes used various heat shock methods wherein heat was applied to the outside of the tube.

It is an object of the invention to provide an improved glass cutting machine and process.

Another object of the invention is to provide a process for cutting or severing glass tubing wherein tubes are scored on the outside and heated on the inside thereof.

Another object of the invention is to provide a means to cut off tubing in production wherein a high quality cut is required for a production machine with a high quality output.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
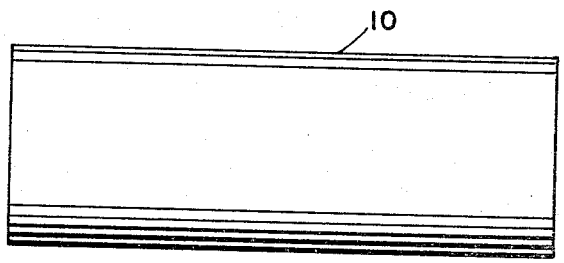
Figure 2:
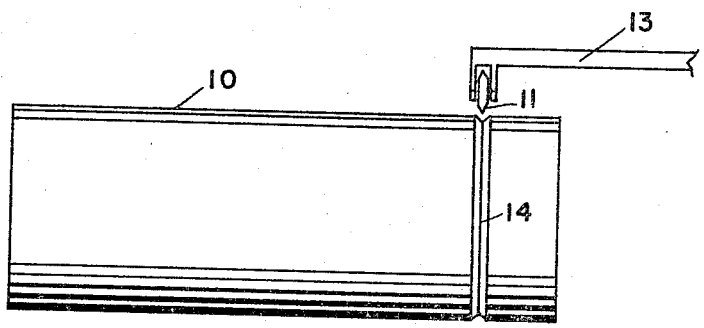
Figure 3:
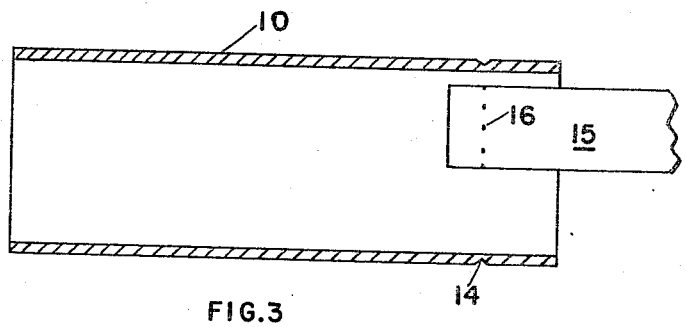

FIGS. 1, 2 and 3 are three stages, respectively, in a process for severing glass tubing according to the invention.

Now with more particular reference to the drawing, tube 10 of glass or similar brittle material is shown that is subject to be severed by heat shock. The tube can be rotated in a machine; for example, such as that shown in Patent 3,077,095.

The tubing, when rotated, is brought into engagement with the glass scoring tool 11 which has a suitable scoring wheel or other suitable scoring device thereon and is supported on the machine frame by means of a supporting member 13. When a suitable score groove is formed around the periphery of the tube as at 14, the tool 11 is retracted and a heating member 15 having the circumferentially spaced holes 16 therein is brought into the inside of the tube. Heating member 15 may be brought in to hold the portion having holes 16 concentrically as is shown in FIG. 3. The gas emitting from the opening 12 can be a mixture of hydrogen and oxygen which give an extremely hot flame. This flame is impinged on a very narrow diameter on the inside of the tube, preferably in accurate relationship to the bottom of the groove or scribed mark 14. This heat will cause a heat shock that will snap the tube off and form a clean cut off end at right angles to the axis of the tube.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A process for severing brittle tubular material comprising
   forming a circumferential groove completely around said tubular material,
   and heating said tubular material on a narrow band around the inner periphery thereof directly opposite said groove whereby said end of said tubular material is severed.

2. A process for severing a glass tube comprising
   forming a circumferential groove in said tube continuously around the outer periphery thereof,
   rotating said tube,
   inserting a heating member having gas jets projecting radially thereof into said tube while said tube is rotating,
   and allowing a flame from said gas jets to impinge on said tube on the inside thereof whereby said tube is severed.

References Cited by the Examiner
UNITED STATES PATENTS

| | | | |
|---|---|---|---|
| 1,320,947 | 11/1919 | Warrick | 65—174 |
| 1,720,883 | 7/1929 | Campbell | 225—93.5 |
| 3,157,328 | 11/1964 | Hennings et al. | 225—96 X |

FOREIGN PATENTS

| | | |
|---|---|---|
| 66,230 | 8/1914 | Austria. |
| 241,189 | 12/1926 | Great Britain. |

WILLIAM W. DYER, JR., *Primary Examiner.*
JAMES M. MEISTER, *Examiner.*